Aug. 11, 1953  J. C. FALKENHAGEN  2,648,546
HYDRAULIC LIFT TRAILER
Filed July 12, 1949  6 Sheets-Sheet 1
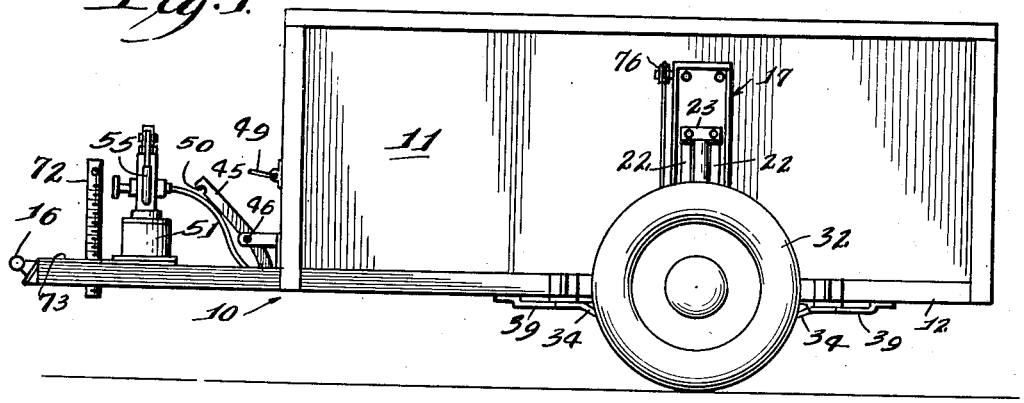
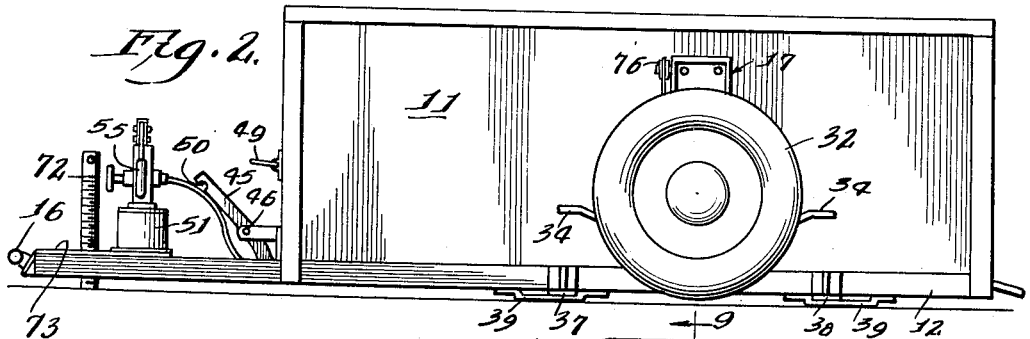
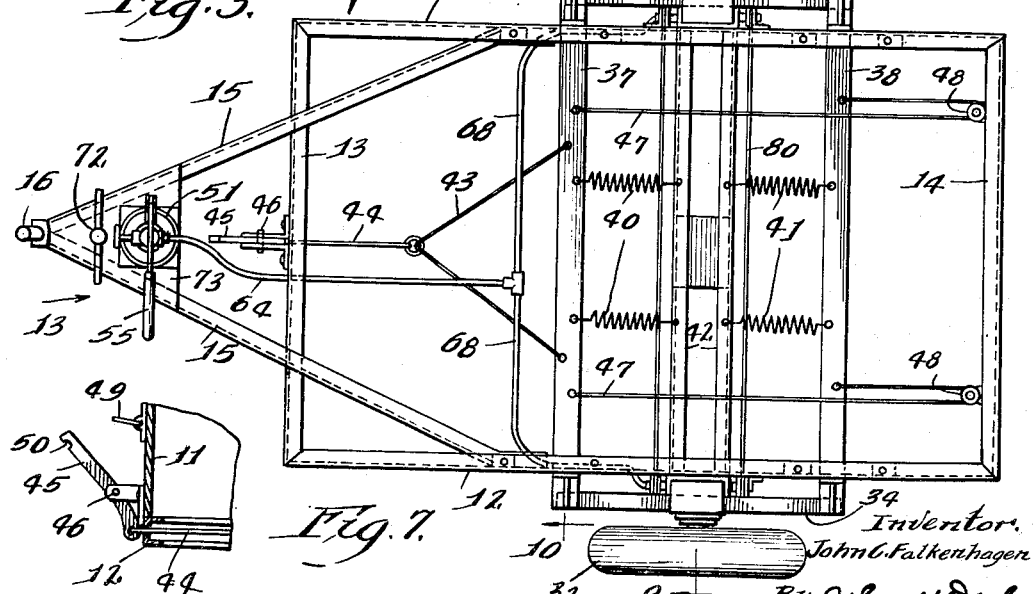

Aug. 11, 1953  J. C. FALKENHAGEN  2,648,546
HYDRAULIC LIFT TRAILER
Filed July 12, 1949  6 Sheets-Sheet 2
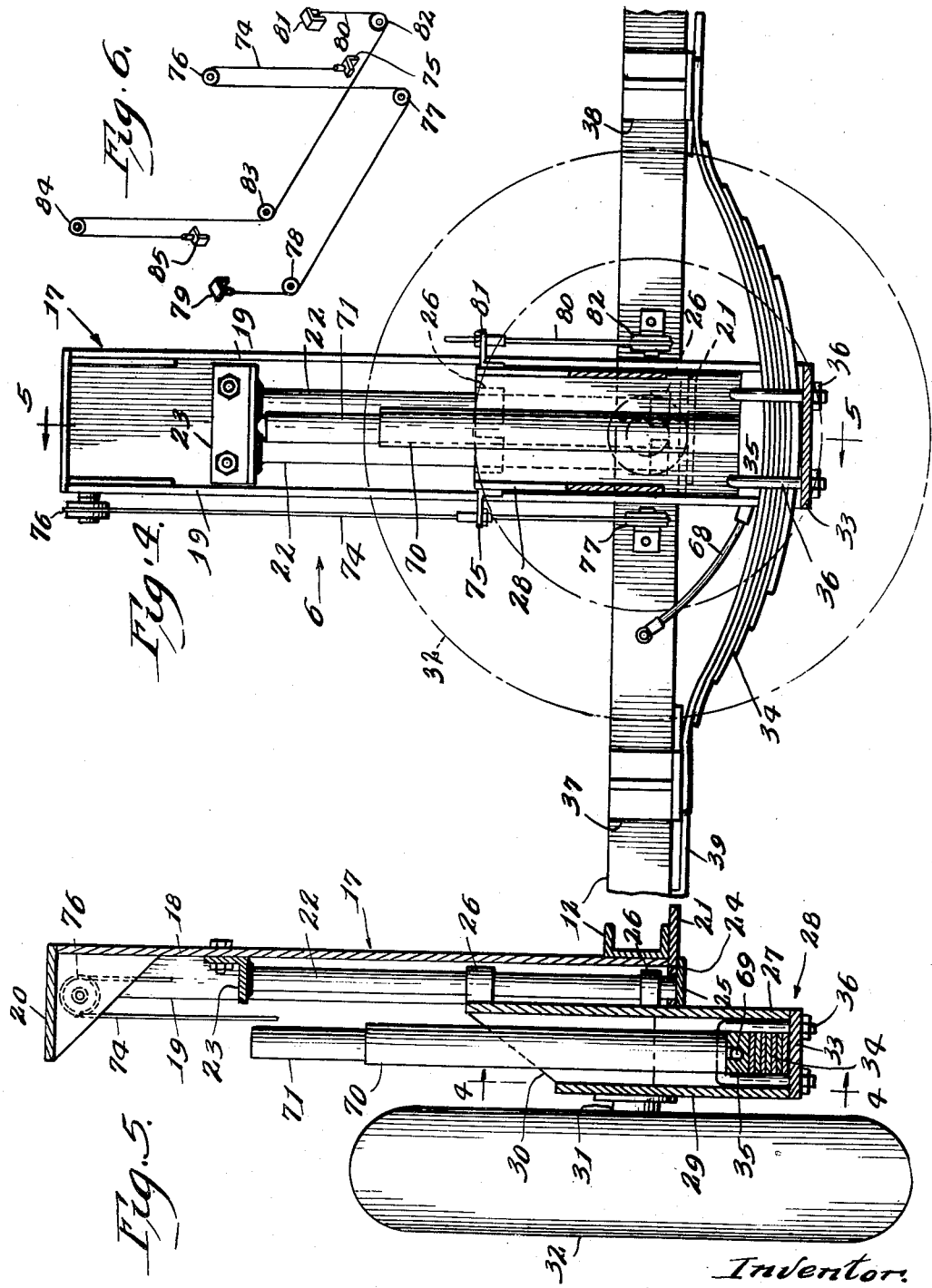
Inventor:
John C. Falkenhagen,
By John W. Darley
Attorney.

Aug. 11, 1953   J. C. FALKENHAGEN   2,648,546
HYDRAULIC LIFT TRAILER
Filed July 12, 1949   6 Sheets-Sheet 3
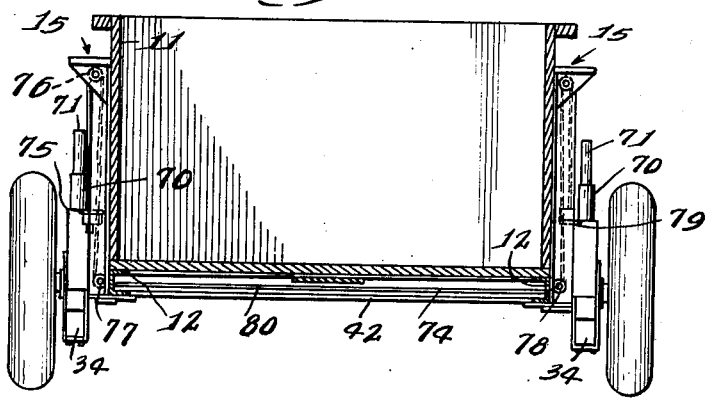
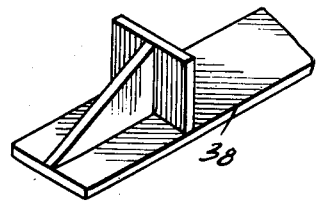
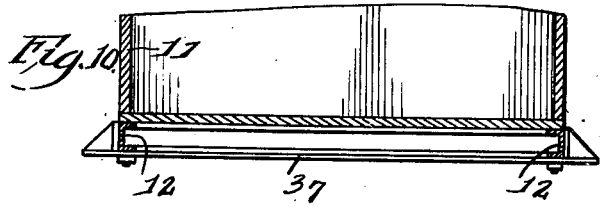
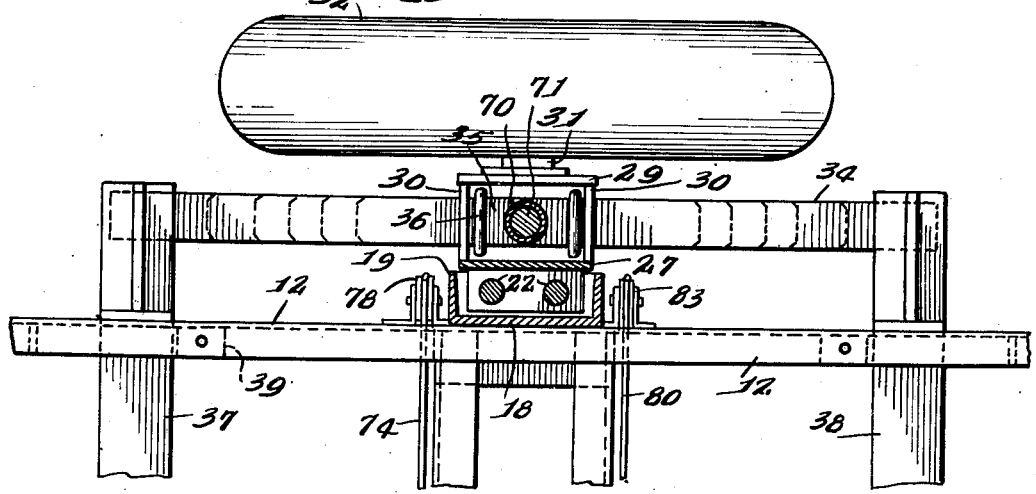
Inventor.
John C. Falkenhagen
By John M. Darley
Attorney.

Aug. 11, 1953     J. C. FALKENHAGEN     2,648,546
HYDRAULIC LIFT TRAILER
Filed July 12, 1949     6 Sheets-Sheet 4
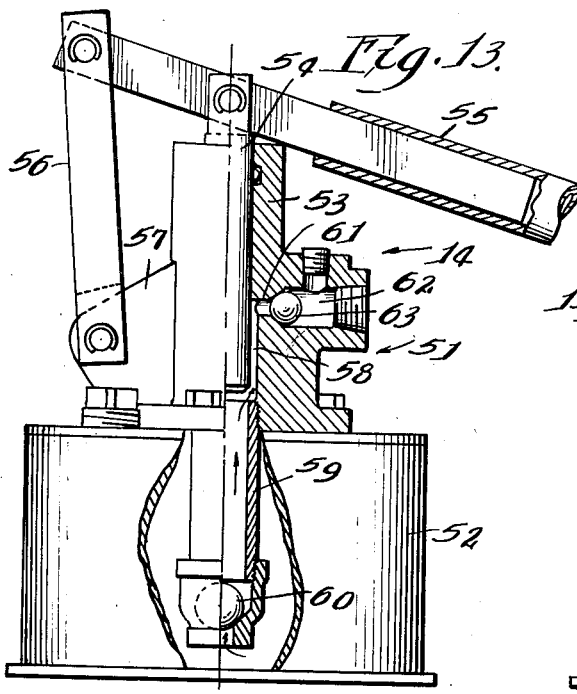
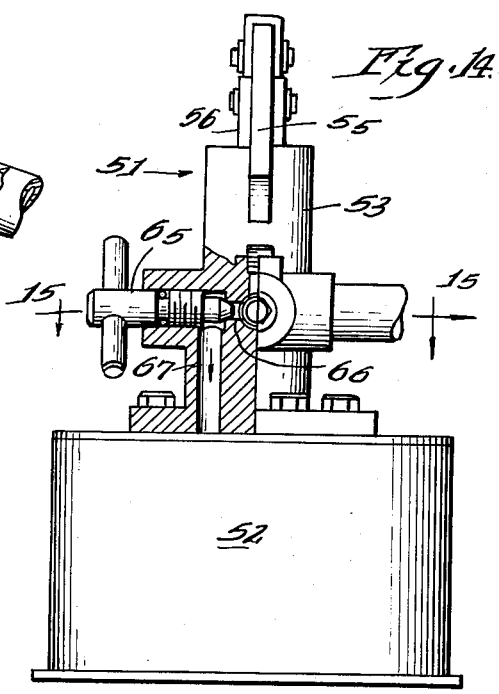
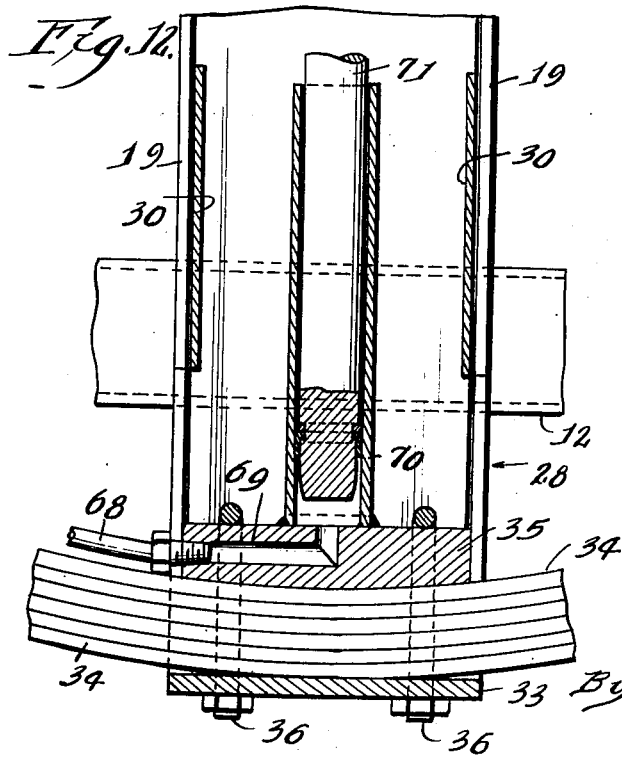
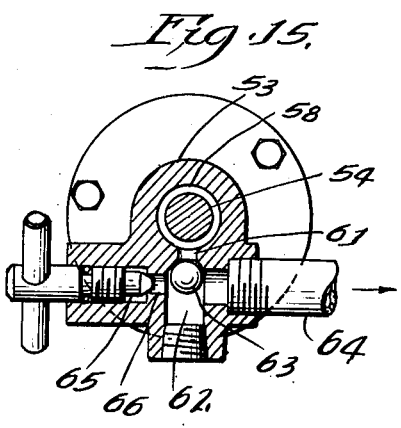
Inventor:
John C. Falkenhagen.
By John M. Darley
Attorney.

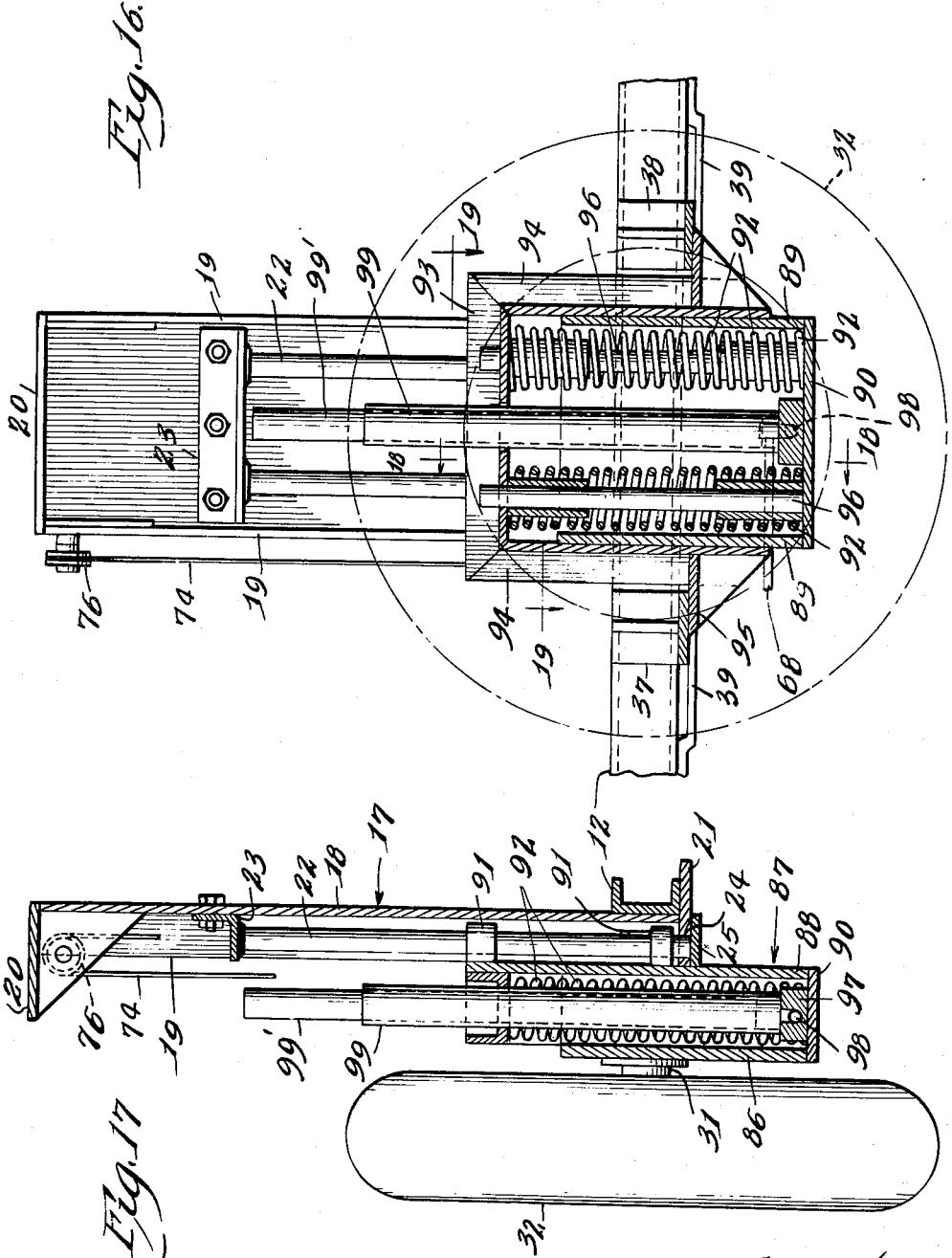

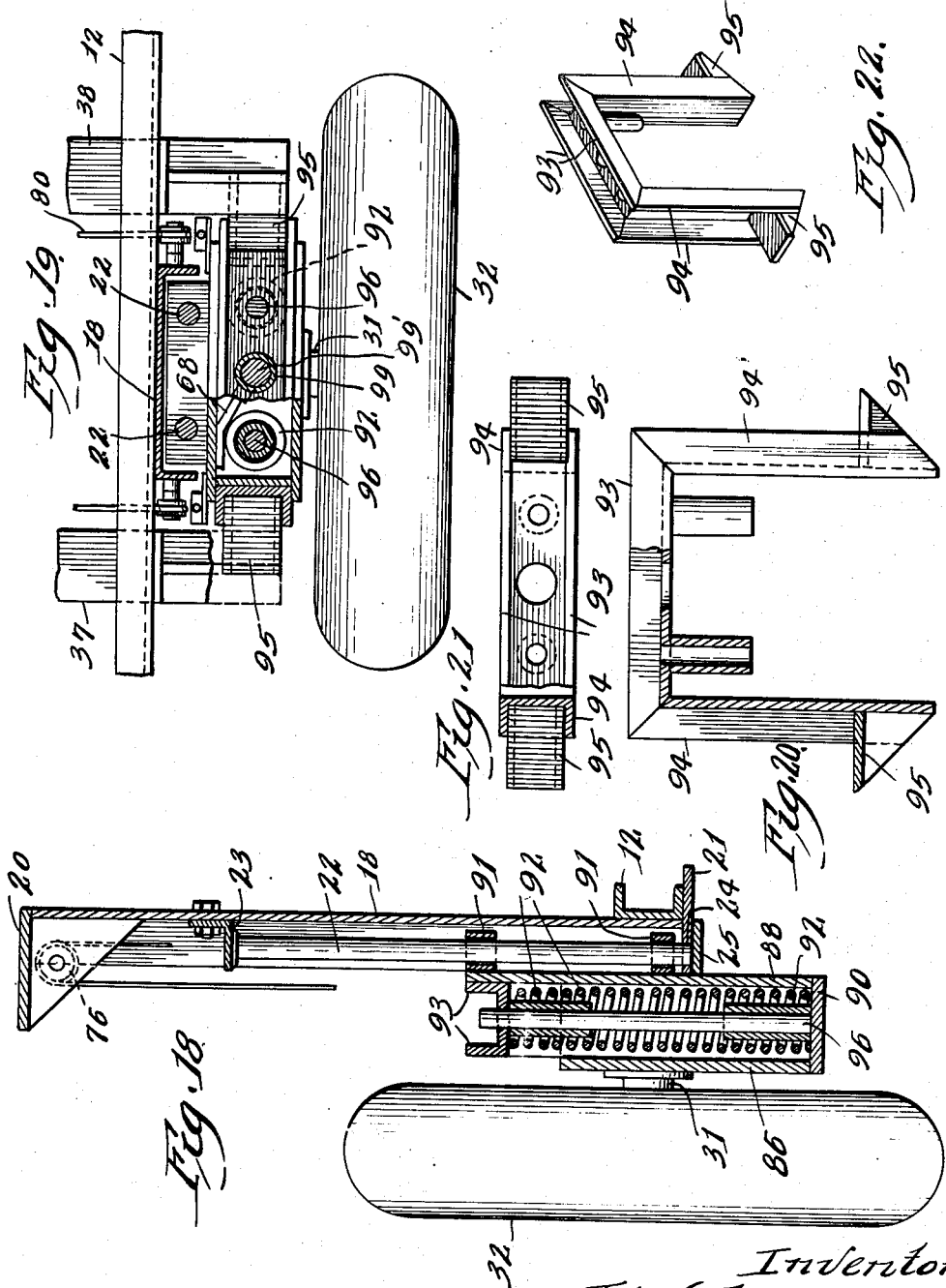

Patented Aug. 11, 1953

2,648,546

UNITED STATES PATENT OFFICE 2,648,546

HYDRAULIC LIFT TRAILER

John C. Falkenhagen, Chicago, Ill., assignor to George L. Nadell, Chicago, Ill.

Application July 12, 1949, Serial No. 104,275

8 Claims. (Cl. 280—44)

My invention relates to hydraulic lift trailers and more particularly to a unit of this type which may be coupled for load transport to any type of towing vehicle, including passenger cars.

One object of the invention is to devise a trailer equipped with a load carrying body that may be hydraulically raised to a transporting position between the wheels or dropped to a substantially ground level position for discharging or receiving a load.

A further object is to provide a two wheel trailer of the character indicated which includes a stabilizing cable system that equalizes the application and release of pressure to the lifting and dropping mechanism on opposite sides of the trailer body and prevents tilting of the body while being raised or dropped.

A further object is to devise a trailer as above characterized whose body is carried on the usual springs during road transport and in which means is provided for disengaging the body from the springs to enable lowering of the body.

A further object is to provide a two wheel trailer as above indicated which includes stub axles whereby the body may be moved between the wheels from one limiting position to another.

These and further objects of the invention will be set forth in the following specification, reference being had to the accompanying drawings, and the novel means by which said objects are effectuated will be definitely pointed out in the claims.

In the drawings:

Figs. 1 and 2 are side elevations of the trailer showing, respectively, the body thereof in raised or load transporting position and in lowered or load discharging or receiving position.

Fig. 3 is a top plan view of the trailer chassis with the body removed.

Fig. 4 is a side elevation, partly in section, of the lift mechanism and spring suspension on the left side of the chassis, considered with respect to its normal direction of movement over a roadway, the body being removed and the near wheel and axle being shown in dot-dash lines, all as taken along the line 4—4 in Fig. 5.

Fig. 5 is a section along the line 5—5 in Fig. 4.

Fig. 6 is a perspective, schematic view of the stabilizing cable system as viewed in the direction of the arrow 6 in Fig. 4.

Fig. 7 is a fragmentary, sectional view of the releasing handle and latch therefor which controls the positions of the yoke bars that rest on the ends of and transfer the body load to the semi-elliptic springs.

Fig. 8 is a perspective view of one end of a yoke bar.

Figs. 9 and 10 are sections respectively taken along the lines 9—9 and 10—10 in Fig. 3.

Fig. 11 is an enlarged view, partly in section, of the upper part or right side of the chassis as it appears in Fig. 3.

Fig. 12 is an enlarged, fragmentary, sectional view of the lower end of the lift mechanism as it appears in Fig. 4.

Fig. 13 is an elevation, partly in section, of the lift pump as viewed in the direction of the arrow 13 in Fig. 3.

Fig. 14 is a side elevation of the pump, partly in section, looking in the direction of the arrow 14 in Fig. 13, and showing the throttle control which regulates the lowering speed of the body.

Fig. 15 is a fragmentary section along the line 15—15 in Fig. 14 showing further details of the throttle control.

Figs. 16 and 17 are elevations, partly in section, corresponding, respectively, to Figs. 4 and 5, but showing a modified arrangement which employs coil or helical instead of semi-elliptic springs.

Figs. 18 and 19 are sections along the lines 18—18 and 19—19, respectively, in Fig. 16.

Figs. 20, 21 and 22 are side, top and perspective views of the spring saddle for transferring the body load to the coil springs.

Referring to Figs. 1 to 3, inclusive, the trailer comprises a chassis 10 having attached thereto an appropriate body 11. The chassis is formed as a generally rectangular frame including side members 12—12, front and rear members 13 and 14, respectively, and V-related members 15—15 which extend forwardly of the front member 13, the spaced ends of the members 15 being fastened respectively to the side members 12 and at the junction of the members 15 is fastened a hitch, generally indicated by the numeral 16, for connecting the trailer to a towing vehicle.

As shown in Figs. 4, 5 and 11, there is attached to the outside of each side member 12 the lower end of a channel upright 17 which extends upwardly therefrom along the side walls of the body 11. The upright 17 includes a web 18 and spaced wings 19 and at its upper end is closed by an abutment plate 20 which extends transversely of and outwardly from the web 18 beyond the wings 19 for a purpose persently explained. The lower end of the upright 17 is closed by a plate 21 which is secured to the underside of the adjacent side member 12 and positioned between the wings 19 is a pair of spaced guide rods 22 whose upper ends are fastened to an angle 23 which in turn is connected to the upright web 18. The lower end of each rod 22 extends through an aperture 24 in the plate 21 and rests on a plate 25 which is secured to the plate 21. Hence, the rods 22 are rigidly connected to the associated upright 17 and move therewith, along with the chassis 10 and body 11 when the latter are raised and lowered as presently described.

Each rod 22 is slidable through upper and lower lugs 26—26 carried by the inside wall 27 of a vertical cage 28 whose outside wall 29 is parallel to the wall 27 and connected thereto by spaced struts 30. A stud axle has its inner end secured to the outer plate 29, extends outwardly therefrom and journaled thereon in an appropriate manner is a supporting wheel 32. The lower end of the cage 28 is closed by a plate 33 on which rests the central part of a semi-elliptic spring 34 which extends lengthwise of the chassis, the spring being clamped between the plate and an overlying block 35 by means of a pair of spaced U-bolts 36—36.

Resting on the ends of each spring are the ends of forward and rear yoke bars 37 and 38 which extend transversely of the chassis with the last named ends projecting outwardly of the side members 12, all respectively (see Figs. 3 and 10). The yoke bars 37 and 38 extend beneath and in contact with the side members 12 and serve to transmit the chassis load to the springs 34. Further, the bars 37 and 38 are conditioned for movement in opposite directions longitudinally of the chassis to clear the ends of the springs and so enable the chassis to be raised or lowered. During these movements, the bars 37 and 38 operate between the under sides of the side members 12 and the offset portions of guide strips 39 which are secured to the members 12, the extremities of the offset portions serving to limit the bar movements. In the raised or load supporting position of the chassis as illustrated in Figs. 3 and 4, the bars 37 and 38 are held in the retracted position shown by springs 40 and 41, respectively, the inner ends of the springs being attached to chassis cross pieces 42—42 and the outer ends to the bars 37 and 38, respectively. For the purpose of further separating the bars 37 and 38 so that their ends will clear the ends of the springs 34, the bar 37 has fastened thereto in symmetrical location with respect to the longitudinal center line of the chassis the ends of a cable 43 whose central portion is connected to a cable 44 that extends forwardly through the front chassis member 13 for attachment to an operating handle 45 (see Fig. 7), that is intermediately pivoted at 46 on the front end of the body 11. To insure simultaneous movement of the rear yoke bar 38, a pair of cables 47—47 have their forward ends secured to the bar 37, thence extend rearwardly of the chassis and around pulleys 48 mounted on the rear member 14, and thence forwardly for connection to the yoke bar 38. Hence, when the handle 45 is rocked clockwise from the position shown in Fig. 7, the ends of the bars 37 and 38 will be simultaneously moved clear of the ends of the springs 34 and the chassis is then conditioned for vertical movement by means presently described. The bars 37 and 38 are held in their further spread positions by engaging a latch link 49 carried by the body 11 with a notch 50 provided in the handle 45.

The chassis is hydraulically raised to the transporting position shown in Fig. 1 and gravity lowered under hydraulic control by instrumentalities which will now be described.

Mounted on the V-related members 15 forwardly of the body 11 and hence easily accessible by the operator is a single acting, lift pump 51 (see Figs. 1, 2 and 3) which is more particularly illustrated in Figs. 13, 14 and 15 to which reference will now be made.

The pump 51 comprises a casing 52 which serves as a reservoir for the working liquid, usually an oil, and mounted on the top of the casing is a cylinder 53 in which is reciprocable a piston 54 whose upper end projects beyond the adjacent end of the cylinder for pivotal connection to an intermediate part of an actuating handle 55. One end of the handle 55 is pivotally connected to one end of a link 56 whose opposite end is pivoted to an ear 57 projecting from the cylinder 53. The lower end of the cylinder bore is enlarged as at 58 and depending from the enlarged bore within the casing 52 is a pipe 59. Entrance of oil from the casing into the pipe is controlled in the usual manner by a freely movable ball 60.

The upper end of the bore 58 communicates through a lateral passage 61 with a chamber 62 and flow in one direction from the passage to the chamber is freely permitted by a ball 63 which denies flow in the opposite direction, the ball 63 engaging a valve seat formed at the junction of the passage and chamber. Hence, when the piston is raised from the position shown in Fig. 13, the ball 60 is unseated and oil flows upwardly into the bore 58. When the piston 54 is moved downwardly, the ball 60 is seated and oil under pressure is forced into the chamber 62 and thence through a pipe 64 to actuate a chassis raising piston presently described.

As already indicated, the chassis is gravity lowered under hydraulic control and during this operation, the oil returns through the pipe 64 to the chamber 62 to thereby seat the ball 63 and prevent return of the oil to the casing through the passage 61. A throttling control on the oil return is provided by a manually controlled valve 65 which regulates the oil flow through a passage 66 that provides communication between the chamber 62 and a passage 67 leading to the casing 52. The pump 51 is a commercially obtainable article and per se does not form any part of the present invention.

As indicated in Fig. 3, the pipe 64 extends rearwardly of the chassis for connection to branch pipes 68—68, each of which connects with one end of a passage 69 (see Fig. 12) in a block 35 above the associated spring 34, the opposite end of the passage communicating with the lower end of a cylinder 70 which is welded to the block and extends upwardly within the cage 28 (see Figs. 4 and 5). Slidable within the cylinder 70 is a piston 71 whose upper end projects beyond the corresponding end of the cylinder and in both chassis raised and lowered positions occupies the position about as shown in Figs. 5 and 12.

In the operation of the trailer, if it is desired to drop the chassis from the position shown in Fig. 1 to that indicated in Fig. 2 where the chassis rests on the ground, the valve 65 is closed and the pump 51 is actuated to raise the piston 71 until it engages the abutment plate 20 and raises the uprights 17 and the connected body and chassis sufficiently to raise the ends of the yoke bars 37 and 38 above the ends of the springs 34. The handle 45, which is conveniently located close to the pump is then rocked clockwise and latched by the link 49 to thereby move the ends of the yoke bars 37 and 38 beyond and clear of the ends of the springs 34. The valve 65 is then opened slightly and the chassis is lowered by gravity, the abutment plates 20 pushing the pistons 71 against the throttling control exercised by the valve 65. The chassis therefore descends slowly and contacts the ground substantially without shock. After the chassis reaches its lowermost position, the pistons 71 continue to drop of their own weight until they about reach the position shown in Fig. 12.

To raise the chassis from its ground position, the valve 65 is closed and the pump 51 is actuated to again move the pistons 71 upwardly to contact the abutment plates 20. The chassis is accordingly moved upwardly to a position slightly above that shown in Fig. 1, in which position the ends of the yoke bars 37 and 38 are at elevations above the ends of the springs 34, but displaced therefrom. Thereupon, the handle 45 is unlatched and rocked to shift the yoke bars 37 and 38 so that their ends are immediately above the ends of the springs 34, the valve 65 is opened slightly, and the chassis slowly descends until it rests on the leaf springs 34. The pistons 71 continue downward until they approximately reach the positions shown in Figs. 5 and 12.

From the foregoing, it will be apparent that the chassis assembly is movable in vertical directions relative to the cage assemblies which carry the wheels, the sole connections between these parts during such movements being provided by the guide rods 22 and lugs 26. Further, these rods and lugs provide adequate structural connections between the chassis and cage assemblies so that the wheels are maintained in proper rolling relation to the ground. When uncoupled from the towing vehicle, the forward end of the chassis may be supported by appropriately positioning a stem 72 that is threaded through a plate 73 carried by the members 15.

An important feature of the invention resides in the arrangement for insuring that the chassis will, during its vertical movements, move freely without binding between the guide rods 22 and lugs 26. Such binding might occur, in view of the rise of the single acting pump, if there were any inequality in the delivery to or return of oil from the cylinders 70. Under such conditions either piston 71 would move up or down, as the case may be, faster than the other piston 71. Therefore, the uprights 17 are tied together by a dual cable system which acts as a stabilizing factor, decreases the tendency of the chassis to cant longitudinally or transversely, and serves to substantially equalize the oil pressure in the cylinders 70.

Referring to Figs. 3, 4, 5, 6 and 9, one end of a cable 74 is fixed to a bracket 75 that is attached to the forward part of that cage 28 which is on the left hand side of the chassis, considered with respect to its normal direction of movement along a roadway. The cable 74 passes upwardly and around a pulley 76 mounted on the forward part of the adjacent upright 17, thence downwardly and around a pulley 77 mounted on the adjacent side member 12, thence transversely of the chassis where it passes around a pulley 78 secured to the side member 12 on the right side of the chassis and thence upwardly for attachment to a bracket 79, similar to the bracket 75, mounted on the forward part of the adjacent cage 28.

Rearwardly of the uprights 17, there is a similar cable system, but reversed in position as follows: One end of a cable 80 is fast to a bracket 81 on the left side cage 28, thence passes downwardly around a pulley 82 carried by the adjacent side member 12, thence transversely of the chassis where it passes around a pulley 83 secured to the right side member 12, thence upwardly and around a pulley 84 that is carried by the rear side of the adjacent upright 17, and thence downwardly for attachment to a bracket 85 carried by the rear end of the right side cage 28.

The schematic relation of the parts just described is best shown in Fig. 6. The brackets, 75, 79, 81 and 85 stand at the same elevation and are always fixed in position since they are carried by the cages 28, while the respective pulleys, being carried by the chassis assembly, change positions with respect to the brackets during vertical movements of the chassis. The cables 74 and 80 are taut at all times.

In Figs. 16 to 22, inclusive, is illustrated a modified design in which helical or coil springs provide the resilient support for the chassis as a substitute for the semi-elliptic springs. Where parts are identical with those already described, they are identified by like numerals.

Each stub axle 31 projects from the outer wall 86 of a cage 87 which includes an inner wall 88, end walls 89—89, and a bottom wall 90. As indicated in Fig. 17, the inner wall 88 extends above the top edge of the outer wall 86 and has affixed thereto upper and lower lugs 91—91, similar to the lugs 26, and through which are slidable the guide rods 22. A pair of coil springs 92—92 are vertically positioned within the cage 87 in spaced relation and with their lower ends resting on the bottom wall 90. The upper ends of the springs abut a spring cap 93 which is provided with a pair of depending legs 94—94 which, respectively, have sliding contact with the outer surfaces of the cage end walls 89—89. The cap 93 and legs 94 act as a spring saddle. Extending laterally from each leg 94 longitudinally of the chassis is a pad 95, the forward pads 95 having resting thereon the ends of the yoke bar 37 during periods of load transport, while the ends of the yoke bar 38 rest on the other pads 95. Auxiliary guide and retaining rods 96—96 may be provided within the cage 87, the lower ends of these rods being carried by the bottom plate 90 and extending upwardly within the springs 92 and slidably through the spring cap 93.

A block 97 is carried by the inner side of the lower cage plate 90 and includes a passage 98 for respectively connecting with one of the branch oil pipes 68 and the lower end of a cylinder 99 which is positioned between the springs 92 and in which is reciprocable a piston 99'. The hydraulic actuation and control of their modification is identical with that described for the leaf spring design, as is also the control of the yoke bars 37 and 38 and the stabilizing cable system.

In both of the foregoing designs, it will be noted that the trailer comprises a plurality of assemblies including a frame assembly which is composed of the side, front and rear members 12, 13 and 14, respectively, and all parts carried thereby, and a pair of wheel assemblies, each of which is composed of a wheel 32, the associated cages 28 or 87, and all parts carried by the respective cages. Generally speaking, the frame assembly is movable relative to the wheel assemblies in vertical directions.

Further, the frame assembly may be stopped during descent from the spring supported position at any point short of ground contact by closing the throttle valve 65 and the frame is then supported on the pistons 71. Under some conditions, the pistons 71 may drop to the bottom of the cylinders 70 and the distance between the top of each piston 71 in the retracted position and the associated plate 20 may be varied as desired. The cables 74 and 80 may be replaced by suitable chains or any appropriate flexible members.

I claim:

1. A lift trailer comprising a frame assembly, supporting wheel assemblies on opposite sides of the frame assembly, coacting formations on the frame and wheel assemblies providing for relative guided movements of the frame assembly, spring means carried by each wheel assembly, bars on the frame assembly movable in one direction to rest on the spring means to support the frame assembly thereon and in the opposite direction to clear the spring means and permit descent of the frame assembly, and a hydraulic system including a pump, a cylinder carried by each wheel assembly, a piston movable upwardly in the cylinder to engage the frame assembly and raise the same to transporting position, and throttle means for controlling the gravity descent of the frame assembly when the bars are freed of the spring means and the pump is not operating.

2. A lift trailer comprising a frame assembly, supporting wheel assemblies on opposite sides of the frame assembly, coacting formations on the frame and wheel assemblies providing for relative guided movements of the frame assembly, a semi-elliptic spring carried by each wheel assembly, bars on the frame assembly movable in one direction to rest on the ends of the springs to support the frame assembly thereon and in the opposite direction to clear the springs and permit descent of the frame assembly, and a hydraulic system including a pump, a cylinder carried by each wheel assembly, a piston movable upwardly in the cylinder to engage the frame assembly and raise the same to transporting position, and throttle means for controlling the gravity descent of the frame assembly when the bars are freed of the springs and the pump is not operating.

3. A lift trailer comprising a frame assembly, supporting wheel assemblies on opposite sides of the frame assembly, coacting formations on the frame and wheel assemblies providing for relative guided movements of the frame assembly, coil springs carried by each wheel assembly, bars on the frame assembly movable in one direction to rest on the springs to support the frame assembly thereon and in the opposite direction to clear the springs and permit descent of the frame assembly, and a hydraulic system including a pump, a cylinder carried by each wheel assembly, a piston movable upwardly in the cylinder to engage the frame and raise the same to transporting position, and throttle means for controlling the gravity descent of the frame assembly when the bars are freed from the springs and the pump is not operating.

4. A lift trailer comprising a frame assembly, supporting wheel assemblies on opposite sides of the frame assembly, coacting formations on the frame and wheel assemblies providing for relative guided movements of the frame assembly, spring means carried by each wheel assembly, bars on the frame assembly movable in one direction to rest on the spring means to support the frame assembly thereon and in the opposite direction to clear the spring means and permit descent of the frame assembly, and stabilizing means for preventing canting of the frame assembly during its vertical movements comprising a cable having its ends attached to the wheel assemblies and extending transversely of and around spaced rollers mounted on the frame, a part of the cable passing around a roller positioned at one side of the frame above the spaced rollers.

5. A lift trailer comprising a frame assembly, supporting wheel assemblies on opposite sides of the frame assembly, coacting formations on the frame and wheel assemblies providing for relative guided movements of the frame assembly, spring means carried by each wheel assembly, bars on the frame assembly movable in one direction to rest on the spring means to support the frame assembly thereon and in the opposite direction to clear the spring means and permit descent of the frame assembly, and stabilizing means for preventing canting of the frame assembly during its vertical movements comprising a pair of cables each having its ends attached to the wheel assemblies and extending transversely of and around spaced rollers mounted on the frame, a part of each cable passing around a roller positioned at one side of the frame above the associated spaced rollers and the higher rollers being located on opposite sides of the frame.

6. A lift trailer comprising a frame assembly, supporting wheel assemblies on opposite sides of the frame assembly, coacting formations on the frame and wheel assemblies providing for relative guided movements of the frame assembly, spring means carried by each wheel assembly, bars on the frame assembly movable in one direction to rest on the spring means to support the frame assembly thereon and in the opposite direction to clear the spring means and permit descent of the frame assembly, and a hydraulic system including a pump, cooperating pistons and cylinders interposed between the frame and wheel assemblies and relatively operable to raise the frame assembly to transporting position, and throttle means for controlling the gravity descent of the frame assembly when the bars are freed of the spring means and the pump is not operating.

7. A lift trailer comprising a frame assembly, supporting wheel assemblies on opposite sides and intermediate the ends of the frame assembly, coacting formations on the frame and wheel assemblies providing for relative guided movements of the frame assembly, parts carried by the frame and wheel assemblies, respectively, and relatively movable between positions in which the parts are engaged to support the frame assembly on the wheel assemblies and in which the parts are disengaged to permit descent of the frame assembly relative to the wheel assemblies, and stabilizing means for preventing canting of the frame assembly during its vertical movements comprising a cable having its ends attached to the wheel assemblies and extending transversely of and around spaced rollers mounted on opposite sides of the frame, a part of the cable passing around a roller positioned at one side of the frame above the spaced rollers.

8. A lift trailer comprising a frame assembly, supporting wheel assemblies on opposite sides of the frame assembly, coacting formations on the frame and wheel assemblies providing for relative guided movements of the frame assembly, means carried by each wheel assembly and detachably engageable with the frame assembly to support the same, and stabilizing means for preventing canting of the frame assembly during its vertical movements comprising a pair of cables each having its ends attached to the wheel assemblies and extending transversely of and around spaced rollers mounted on the frame, a part of each cable passing around a roller positioned at one side of the frame above the associated spaced rollers and the higher rollers being located on opposite sides of the frame.

JOHN C. FALKENHAGEN.

References Cited in the file of this patent

UNITED STATES PATENTS

| Number | Name | Date |
|---|---|---|
| 1,978,498 | Littman | Oct. 30, 1934 |
| 2,002,605 | Kincaid, Jr. | May 28, 1935 |
| 2,475,443 | Bill | July 5, 1949 |
| 2,480,909 | Davis | Sept. 6, 1949 |
| 2,495,449 | Francis | Jan. 24, 1950 |
| 2,563,912 | Kemmerer | Oct. 24, 1950 |
| 2,582,896 | Acton | Jan. 15, 1952 |

FOREIGN PATENTS

| Number | Country | Date |
|---|---|---|
| 766,917 | France | Apr. 23, 1934 |